Figures 1, 2:
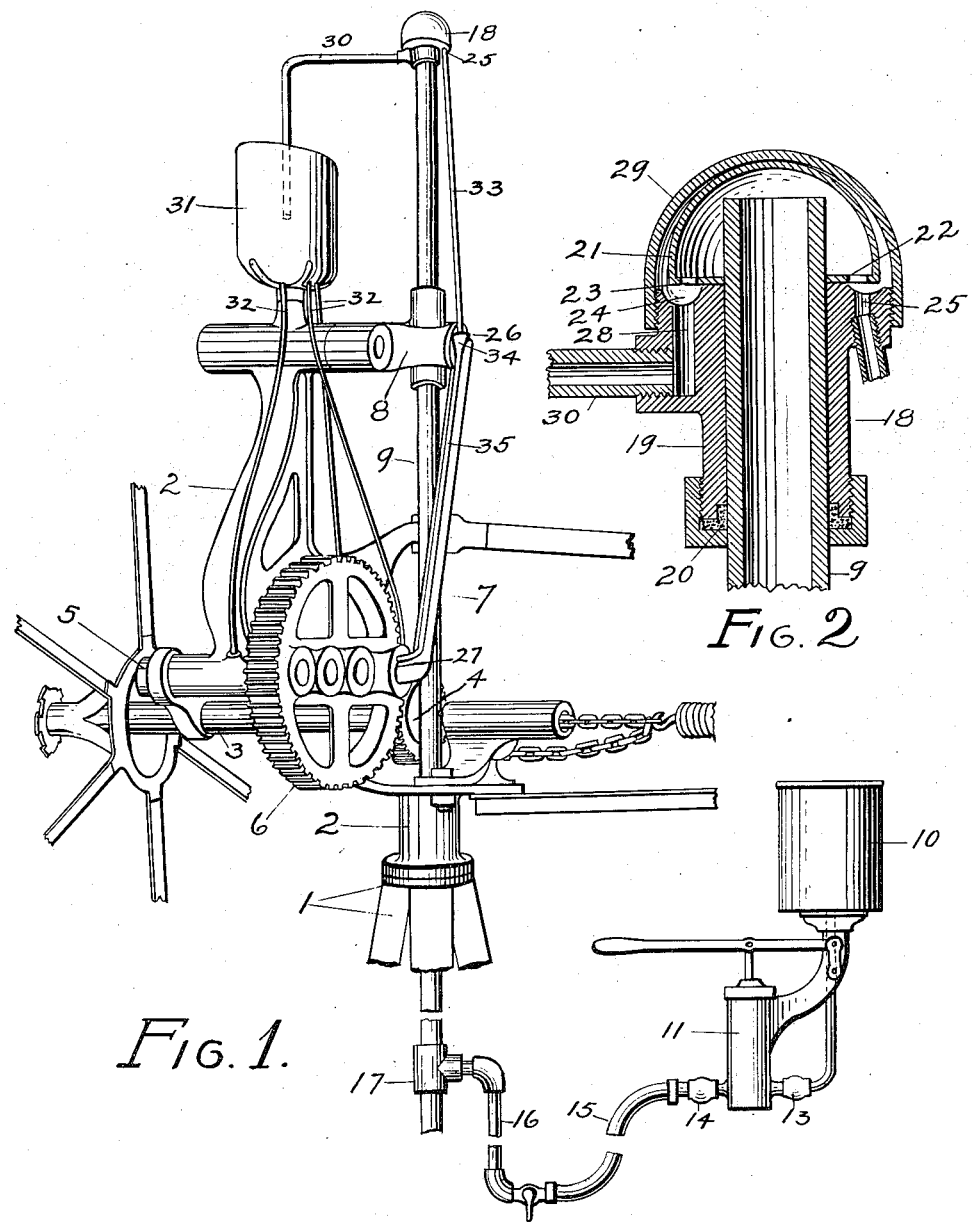

G. A. DENIS.
WINDMILL OILING APPARATUS.
APPLICATION FILED JAN. 17, 1911.

1,001,255.

Patented Aug. 22, 1911.

WITNESSES.
INVENTOR
George A. Denis

UNITED STATES PATENT OFFICE.

GEORGE A. DENIS, OF GREEN BAY, WISCONSIN.

WINDMILL-OILING APPARATUS.

1,001,255.  Specification of Letters Patent.  Patented Aug. 22, 1911.

Application filed January 17, 1911. Serial No. 604,006.

*To all whom it may concern:*

Be it known that I, GEORGE A. DENIS, a citizen of the United States, residing at Green Bay, in the county of Brown and State of Wisconsin, have invented a new and useful Apparatus known and described hereinafter as a "Windmill-Oiling Apparatus," of which the following is a specification.

My invention consists of an apparatus for oiling the bearings of a windmill by forcing oil by means of a force pump and a pipe leading to the highest point of the windmill machinery and distributing the oil from that point through a swivel cap and an auxiliary reservoir to the various bearings by gravity.

In the accompanying drawing illustrative of the device Figure 1 represents a partial perspective view of the mechanism, and Fig. 2 a sectional view through the swivel cap and arm mounted on the upper end of the pump rod.

Similar numbers refer to similar parts in the several views.

1 represents the apex or swivel top of an ordinary pattern of a windmill tower. I have represented as mounted upon this a common form of windmill mechanism as best showing the application of my device though I propose to apply my device to any pattern of windmill in which the circular motion of the wheel is made to impart a reciprocating motion to a vertical rod or shaft.

In the common form here shown, 2 is the frame, 3 the wheel shaft, 4 the driving pinion, 5 the counter shaft, 6 the crank gear, 7 the connecting rod, 8 the crosshead, 9 the pump rod, which is attached to the pump rod or shaft below.

My device consists of the following attachments:—10 is an oil reservoir, 11 a force pump attached thereto or used in connection therewith, with check valves 13 and 14. 15 is a flexible hose for attachment between pump and the oil conduit 16 which is attached to the pump rod or driving shaft, and is connected with the pump rod 9 at 17.

In the ordinary pattern of windmill the pump rod 9 is a solid rod which I replace with a pipe, which I use as a continuation of the oil pipe riser. I carry this pipe some distance above the top of the crank connection, and terminate it with a swivel cap 18 which is shown in perspective Fig. 1 and in section in Fig. 2. This swivel cap consists of a ferrule 19 in which the pump rod 9 turns, a packing ring 20, and half ball 21 with a diaphragm 22 which fits the pump rod 9 tightly, and is attached thereto. Openings 23 are made in the outer portion of the diaphragm over an oil groove 24 in the top of the ferrule. This groove is tapped at 25 for an oil feeder to the two connecting rod end bearings 26 and 27. The main outlet of the cap is at 28. A tight cap 29 closes the top of the swivel cap. From outlet 28 a pipe 30 in the form of an arm is led over and into an auxiliary oil reservoir 31 which is placed above the frame of the mill and at a higher point than any of the bearings of same. From the bottom of this auxiliary oil reservoir 31 tubes 32 lead to the various bearings below. To reach bearing 27 a tube 33 leading from the swivel cap 18 is carried down to center of bearing 26 into a little hopper 34 formed at the top of a tube 35 leading to the bearing 27. Tube 35 is attached to the connecting rod 7. Pump rod 9 does not turn with the mechanism. The whole upper mechanism of the mill however turns with the varying direction of the wind upon swivel 2. The arm 30 is placed high enough above and the drop of the end long enough so that the drop end will always be below the top of the auxiliary oil reservoir. This drop end will be led through an elongated hole in the cover of the auxiliary oil reservoir and the drop part of the arm striking the sides of the cover will cause the swivel cap to turn when the windmill head turns with the wind. The arm raises and lowers with respect to the auxiliary oil reservoir 31 with the reciprocating motion of the connecting rod 7 but the lower end being always inside and below the cover of the auxiliary oil reservoir the oil is retained.

By means of the mechanism above described oil is pumped from the lower oil reservoir to the highest point, a part delivered directly to the bearings, and a part led into an auxiliary reservoir and from thence distributed by gravity to the various points needed. A small quantity of oil is pumped at a time and the bearings oiled whenever needed.

What I claim as novel and desire to secure by Letters Patent is:

1. An oiling device for windmills comprising a reservoir, an oil conduit, a swivel cap, an auxiliary reservoir and means for distributing oil to a portion of the bearings from said auxiliary reservoir.

2. An oiling device for windmills comprising an oil conduit, a hollow pump rod providing a continuation of said conduit, a swivel cap on the hollow pump rod, an auxiliary reservoir, a pipe leading from the swivel cap to the auxiliary reservoir, means for forcing oil through the oil conduit, means for distributing oil from the swivel cap to a portion of the bearings, means for distributing oil from the auxiliary reservoir to a portion of the bearings.

3. In a windmill oiling device a hollow pump rod, a swivel cap on said pump rod, means for forcing oil through said hollow pump rod, and means for delivering oil from the swivel cap to various bearings and an auxiliary reservoir as set forth.

4. In an oiling device a hollow pump rod, a swivel cap on said pump rod, an auxiliary reservoir, and means for distributing oil from the reservoir by gravity to the various bearings.

5. In an oiling device a hollow pump rod, a swivel cap on said pump rod, means for distributing oil from the swivel cap to a portion of the bearings, means for delivering oil into an auxiliary reservoir as set forth.

GEORGE A. DENIS.

Witnesses.
  RAY E. NICHOLSON,
  P. T. BENTON.